United States Patent
Kim et al.

(10) Patent No.: US 7,715,473 B2
(45) Date of Patent: May 11, 2010

(54) CHANNEL EQUALIZER, METHOD AND COMPUTER PROGRAM FOR EQUALIZING A CHANNEL

(75) Inventors: Do-Han Kim, Suwon-si (KR); Hyun-Bae Jeon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1610 days.

(21) Appl. No.: 10/918,427

(22) Filed: Aug. 16, 2004

(65) Prior Publication Data

US 2005/0041732 A1 Feb. 24, 2005

(30) Foreign Application Priority Data

Aug. 21, 2003 (KR) .................... 10-2003-0057998

(51) Int. Cl.
*H04B 1/38* (2006.01)
(52) U.S. Cl. .................. 375/233; 375/350; 375/232; 708/300; 708/819; 708/322; 708/252
(58) Field of Classification Search .......... 375/316, 375/229–236, 350, 269, 279, 362, 355, 308, 375/334, 361; 708/300, 322, 323, 819, 252, 708/632, 5, 8, 21, 404; 348/726, 807, 322, 348/344
See application file for complete search history.

(56) References Cited

U.S. PATENT DOCUMENTS 6,108,681 A    8/2000  Wittig et al.
6,144,697 A *  11/2000 Gelfand et al. ............. 375/233
6,483,872 B2 * 11/2002 Nguyen ..................... 375/231
6,693,958 B1 *  2/2004 Wang et al. ................ 375/232
6,816,548 B1 * 11/2004 Shiue et al. ................ 375/233
6,693,617 B2   11/2005 Armour et al.
7,548,582 B2 *  6/2009 Kim et al. .................. 375/232
2001/0031000 A1 10/2001 Nguyen

FOREIGN PATENT DOCUMENTS

CN      1258166        6/2000
JP      2002-535925    10/2002
WO      WO 03/069864   8/2003

OTHER PUBLICATIONS

First Office Action issued by Chinese Patent Office on Oct. 10, 2008 for counterpart Chinese application.
Second Office Action issued by Chinese Patent Office on Sep. 4, 2009 for counterpart Chinese application.
Notice of First Office Action from Japanese Patent Office dated Nov. 24, 2009 for corresponding Japanese application.

* cited by examiner

*Primary Examiner*—David C Payne
*Assistant Examiner*—Rahel Guarino
(74) *Attorney, Agent, or Firm*—Harness, Dickey & Pierce

(57) ABSTRACT

A channel equalizer, method and computer program for equalizing a channel. The channel equalizer may include a feed forward filter and a switching unit. The switching unit may receive a signal input to the channel equalizer and an output signal from the feed forward filter, and may supply one of the input signal and output signal as an input to the feed forward filter.

10 Claims, 4 Drawing Sheets

CHANNEL EQUALIZER, METHOD AND COMPUTER PROGRAM FOR EQUALIZING A CHANNEL

PRIORITY STATEMENT

This application claims the priority of Korean Patent Application No. 2003-57998, filed on Aug. 21, 2003 in the Korean Intellectual Property Office, the disclosure of which is incorporated herein in its entirety by reference.

BACKGROUND OF THE INVENTION

1. Field of the Invention

The present invention relates, in general, to a channel equalizer, a method and a computer program for equalizing a channel.

2. Description of the Related Art

A physical channel of a digital communication system such as a high definition television (HDTV) system generally exists in free space. An ideal channel may be implemented in a vacuum state, i.e., without a medium. However, since a transmission path of a channel signal may be refracted due to atmospheric changes, meteorological changes, etc., the signal may be transmitted to a receiver via multiple paths.

Multiple paths may include fixed multiple paths and time-dependent multiple paths, for example. Fixed multiple paths are paths on which a transmitted signal is reflected or refracted due to natural features or structures, such as a mountain, cliff, etc. Time-dependent multiple paths are paths by which a transmitted signal is propagated differently due to moving vehicles such as airplanes and cars, for example.

When a signal is transmitted over various paths with different propagation times, the signal (received through such multiple paths) may have inter symbol interference (ISI). ISI typically deteriorates performance of high-speed digital communication systems such as HDTV systems.

Accordingly, a channel may generate signal distortion. Since such signal distortion may cause bit detection errors in a receiving side when signals are transmitted according to conventional digital communication methodologies used in a HDTV, etc., an entire area of a picture may not be restored, and/or an erroneous picture may appear.

In an effort to solve these errors or problems with picture quality, an HDTV receiver may include a channel equalizer that processes transmission signals passed through a distorted channel, so as to compensate for the characteristic of the channel.

SUMMARY OF THE INVENTION

An exemplary embodiment of the present invention is directed to a channel equalizer. The channel equalizer may include a feed forward filter and a switching unit. The switching unit may receive a signal input to the channel equalizer and an output signal from the feed forward filter, and may supply one of the input signal and output signal as an input to the feed forward filter.

Another exemplary embodiment of the present invention is directed to a channel equalizer. The channel equalizer may include a feed forward filter and a switching unit. The feed forward filter may include an input terminal and an output terminal. The switching unit may include a first input terminal for receiving an input signal, a second input terminal connected to the output terminal of the feed forward filter via a feedback path, and an output terminal connected to the input terminal of the feed forward filter.

Another exemplary embodiment of the present invention is directed to a channel equalizer. The channel equalizer may include a feed forward filter, a buffer unit connected to an output terminal of the feed forward filter and a switching unit. The switching unit may receive a signal input to the channel equalizer and an output signal of the buffer unit and may supply, as an input to the feed forward filter, one of the input signal and the output signal of the buffer unit.

Another exemplary embodiment of the present invention is directed to a method for equalizing a channel. In a channel equalizer having a feed forward filter, it may be determined whether an output signal of the channel equalizer converges. If the output signal does not converge, a training sequence may be fed back, via a feedback path to the feed forward filter, as an input to the feed forward filter.

Another exemplary embodiment of the present invention is directed to an apparatus for equalizing a channel signal. The apparatus may include a feed forward filter configured to compensate for distortion in a channel signal input to the apparatus, and a switching unit configured to supply, based on receipt of a control signal, an output signal to the feed forward filter. The feed forward filter may compensate for distortion in the input channel signal based at least on the output signal received from the switching unit.

Another exemplary embodiment of the present invention is directed to a method for equalizing a channel signal input to an equalizer of a high-definition television (HDTV) receiver. In the method, it may be determined whether an output signal of the equalizer converges. At least one training sequence to be used for compensating for any distortion in the input channel signal may be provided, if the output signal does not converge.

Another exemplary embodiment of the present invention is directed to a computer program product. The computer program product may include a computer-readable medium having computer program logic stored thereon for enabling a processor to equalize a channel in a channel equalizer having a feed forward filter. The computer program logic may cause the processor determine whether an output signal of the channel equalizer converges, and to feed back, via a feedback path to the feed forward filter, a training sequence as an input to feed forward filter, if the output signal does not converge.

Another exemplary embodiment of the present invention is directed to a computer program product. The computer program product may include a computer-readable medium having computer program logic stored thereon for enabling a processor to equalize a channel signal input to an equalizer of a high-definition television (HDTV) receiver. The computer program logic may cause the processor to determine whether an output signal of the equalizer converges, and to provide at least one training sequence to be used for compensating for any distortion in the input channel signal, if the output signal does not converge.

Another exemplary embodiment of the present invention is directed to a computer data signal embodied in a carrier wave. The computer data signal may be adapted for equalizing a channel in an equalizer having a feed forward filter. The computer data signal may include instructions for determining whether an output signal of the channel equalizer converges, and instructions for feeding back, via a feedback path to the feed forward filter, a training sequence as an input to feed forward filter, if the output signal does not converge.

Another exemplary embodiment of the present invention is directed to a computer data signal embodied in a carrier wave. The computer data signal may be adapted for equalizing a channel signal input to an equalizer of a high-definition television (HDTV) receiver. The computer data signal may include instructions for determining whether an output signal of the equalizer converges, and instructions for providing at least one training sequence to be used for compensating for any distortion in the input channel signal, if the output signal does not converge.

BRIEF DESCRIPTION OF THE DRAWINGS

The present invention will become more apparent by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION OF THE EXEMPLARY EMBODIMENTS

In general, exemplary embodiments are provided herein in an effort to improve channel equalizer performance in high-speed digital communication systems such as HDTV systems, for example. In an exemplary aspect, the exemplary methodologies and/or apparatus described hereafter may utilize repeated training sequences to compensate for distortion in a signal input to the channel equalizer, if output signals of the channel equalizer do not converge within a given desired range.

Figure 1:
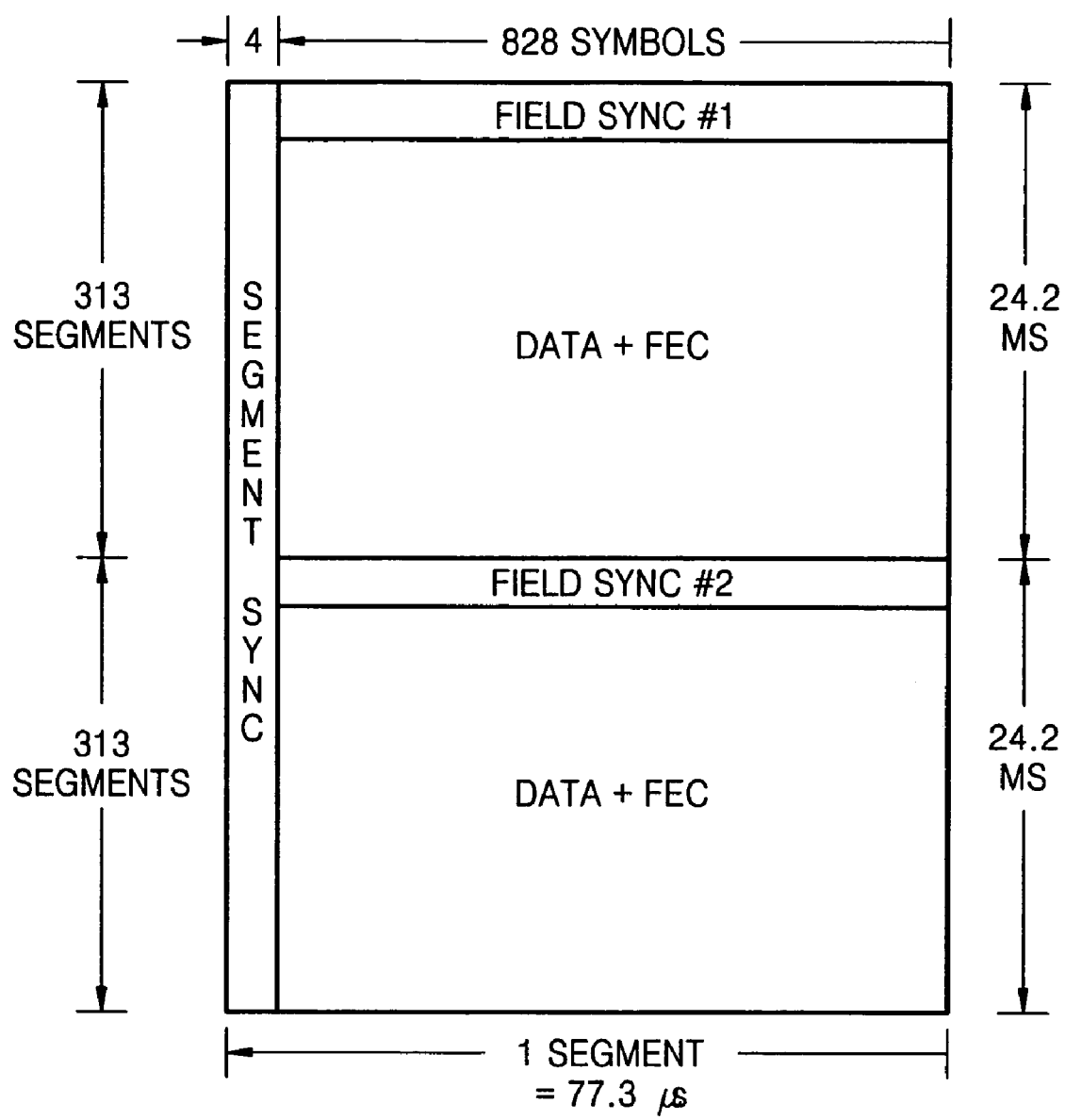
FIG. 1 illustrates a general format of a data frame used in a high-definition television.

FIG. 1 illustrates a general format of a data frame used in a high-definition television. The data frame shown in FIG. 1 is a data frame defined by the Advanced Television System Committee (ATSC) standard for high-definition television (HDTV). The data frame may include two data fields, where each data field may include 313 segments. Each segment may include 832 symbols. The first four symbols of each segment are transmitted in binary form, as a segment synchronization signal.

A first segment (FIELD SYNC#1 or FIELD SYNC#2) of each data field is a synchronization signal (or data field synchronization signal), and may include a training sequence used by a channel equalizer of a receiver such as an HDTV receiver, for example. The training sequence may have a given pattern that is recognized by the receiver and by a transmitter, for example.

The data field synchronization signal may be periodically generated. When an error is generated in the symbols of a transmitted signal, such as may happen due to changes in the characteristics of a channel, the channel equalizer adjusts given coefficients using the training sequence, in an effort to cancel out changes in the characteristics of the channel.

The remaining 312 segments (DATA+FEC, excluding the first segment) may include data containing actual information. To implement channel equalization using a training sequence, data with a given pattern capable of being recognized by both the receiver and the transmitter may be used. In other words, for a receiver to equalize a channel using a received signal, a transmitter transmits a data sequence that is capable of being recognized by the receiver for a given time period. The receiver compares a data waveform distorted through the channel to an original, known data waveform so as to estimate the level of distortion in the channel.

The given time period discussed above may be referred to as a 'training mode', and the data sequence transmitted in the training mode may be referred to as a 'training sequence'. The training sequence may generally be embodied as a pseudo training sequence, for example. Once the training mode has terminated, a given time period elapses, during which the decided data (from the comparison) is substituted (transmitted) for the data sequence. The given time period after training mode termination may be referred to as a 'blind mode'.

Figure 2:
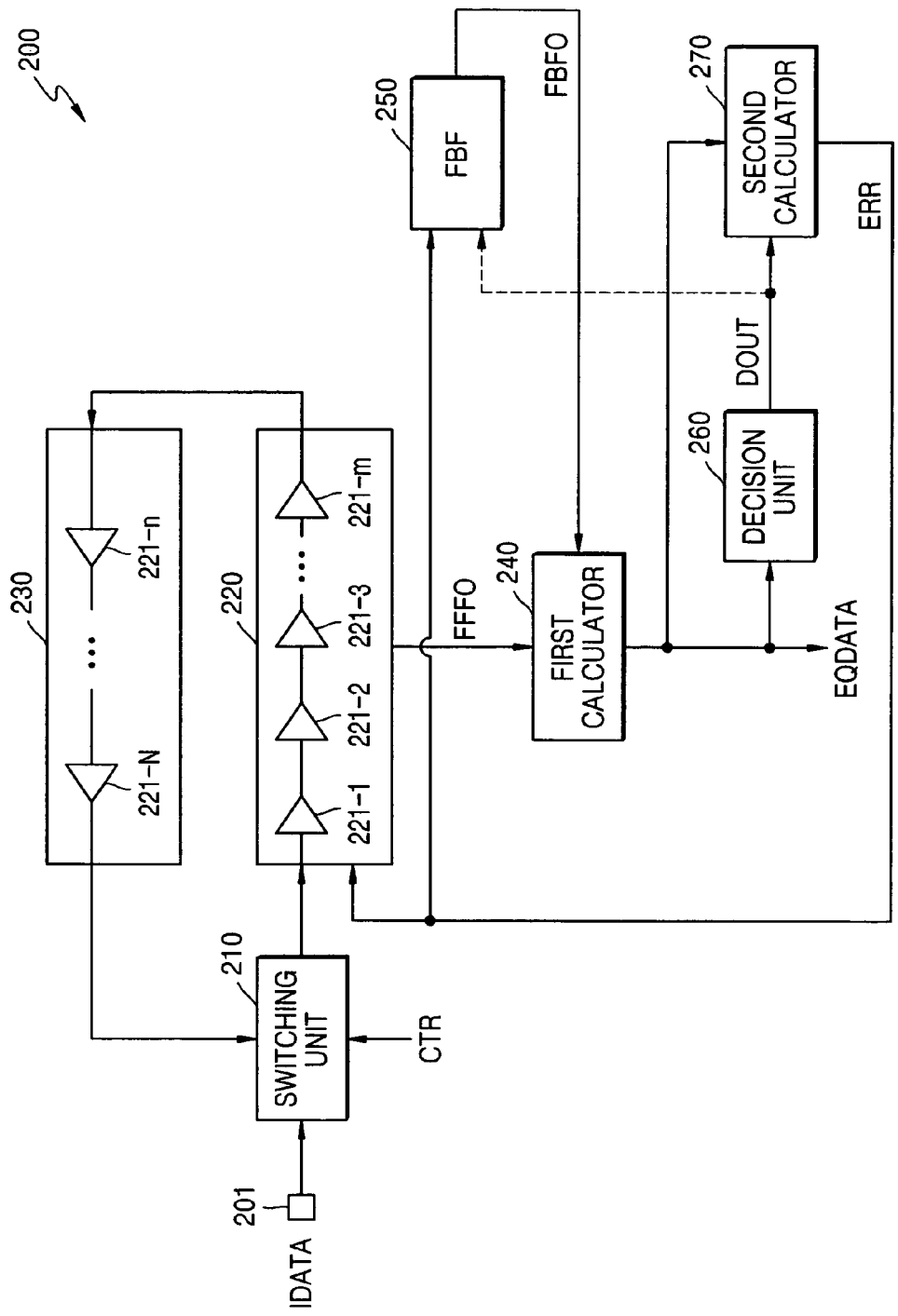
FIG. 2 is a block diagram of a channel equalizer according to an exemplary embodiment of the present invention.

FIG. 2 is a block diagram of a channel equalizer according to an exemplary embodiment of the present invention. Referring to FIG. 2, the channel equalizer 200 may include a switching unit 210. The switching unit 210 transmits a first data segment (FIELD SYNC #1 of FIG. 1) including a training sequence from input signal IDATA through a first input terminal 201, or a least one data segment from second through 313-th segments (DATA+FEC of FIG. 1) of the input signal IDATA, to a feed forward filter 220, in response to a control signal CTR. In this example, the channel equalizer 200 may operate in a training mode or in a blind mode, based on the control signal CTR received.

The feed forward filter 220 may include a plurality of filter cells (or tap cells) 221-1 through 221-$m$ that may be serially connected to each other. Each of the plurality of filter cells 221-1 through 221-$m$ may include a shift register (not shown for reasons of clarity) for storing a corresponding training sequence.

In this example, the number of filter cells may be smaller than the number N of symbols making up one segment of a data frame. Here, m may be equal to 512, and the number N of symbols making up one segment may be 832. Each of the plurality of filter cells (221-1 through 221-$m$, 221-$n$ through 221-N; n=513, N=832) store symbols of a corresponding training sequence, and each symbol consists of K bits (K is a natural number, for example, K=10)

Thus, the number N (for example, N=832) of symbols in a segment of the data frame may be a natural number greater than n, where n may also be a natural number (for example, n=513), and is also greater than m (for example, m=512). Accordingly, the number of filter cells in the buffer unit 230 may be N-m, for example.

A 512-th filter cell 221-$m$ (where m=512) of the feed forward filter 220 may be connected to a first filter cell 221-$n$ (where n=513) of the buffer unit 230. An 832-nd filter cell 221-N (where N=832) of the buffer unit 230 may be connected to a second input terminal of the switching unit 210. Accordingly, the symbols of each training sequence may be sequentially shifted through the filter cells. Therefore, an output signal of the feed forward filter 220 may be fed back, as an input, to the feed forward filter 220 via buffer unit 230 and switching unit 210.

Referring again to FIG. 2, if an output signal EQDATA of the channel equalizer 200 does not converge within a given range, the channel equalizer 200 may repeatedly use the training sequences stored in the filter cells of the feed forward filter 220 and the filter cells of the buffer unit 230, based on a control signal CTR. For example, the training sequences may be fed back and/or provided as an input to the switching unit 210. Accordingly, in this example the control signal CTR may control a count of the training sequences used.

On the contrary, if the output signal EQDATA of the channel equalizer 200 converges within a given range, the channel equalizer 200 may transmit at least one data segment among the second through 313-th segments (DATA+FEC of FIG. 1) to the feed forward filter 220 in response to the control signal CTR. At this time, the filter cells 221-1 through 221-N do not store symbols of the data segment.

The feed forward filter 220 may receive an output signal from the switching unit 210 and an error signal ERR from a second calculator 270, may compensate for distortion in the signals output of the switching unit 210 based at least on the ERR, and may output a compensated result FFF0 to a first calculator 240. Accordingly, the feed forward filter 220 may be configured so as to remove pre-ghosts included in the input signal IDATA. A pre-ghost is where the ghost (0-db signal) occurs before the main image. Pre-ghosts can occur in digital systems such as HDTV systems, where it is possible for the strong, main image to have a propagation delay through the system that is longer than the time it takes for a weak, direct-broadcast pickup to be received.

Each of the error signals ERR may independently control (or update) a corresponding coefficient of each of the plurality of the filter cells 221-1 through 221-$m$. Accordingly, and as is known to those of ordinary skill in the art, each of the error signals ERR input to the feed forward filter 220 may be multiplied by the output signals of the switching unit 210, the multiplied results summed, and the summed result output as the output signal FFF0 of the feed forward filter 220.

The first calculator 240 receives the output signal FFF0 and an output signal FBF0 from a feed backward filter 250, sums the signals and outputs the summed result as an output signal EQDATA of the channel equalizer. The feed backward filter 250, as is known to those of ordinary skill in the art, may include a plurality of filter cells (not shown) serially connected to each other. The feed backward filter 250 may receive an output signal DOUT from the decision unit 260, and may output an output signal FBF0 based on the error signal ERR and DOUT to the first calculator 240. Accordingly, the feed backward filter 250 may be configured to remove post-ghosts (where the ghosted image is a weaker replica of the main image being delayed to occur later in time) included in the input signal IDATA.

The decision unit 260, which may be implemented by slicer, for example, receives the output signal EQDATA from the first calculator 240 and outputs DOUT, a decision value, to the feed backward filter 250 and the second calculator 270. Generally, the decision value DOUT may be a value selected from eight values: 7, 5, 3, 1, −1, −3, −5, and −7. Thus, the decision unit 260 receives the output signal EQDATA of the first calculator 240 and outputs a decision value (DOUT) to the feed backward filter 250 and the second calculator 270.

The second calculator 270 receives EQDATA from the first calculator 240 and DOUT from the decision unit 260, and subtracts EQDATA from DOUT to generate the error signals ERR. As discussed above, each of the error signals ERR may control (or update) a corresponding coefficient of each of the filter cells of the feed forward filter 220, and also may control or update a corresponding coefficient of each of the filter cells in the feed backward filter 250. Accordingly, the feed forward filter 220 and feed backward filter 250 may compensate for distortions in the input signal IDATA, respectively, based on the received ERR signals.

Figure 3:
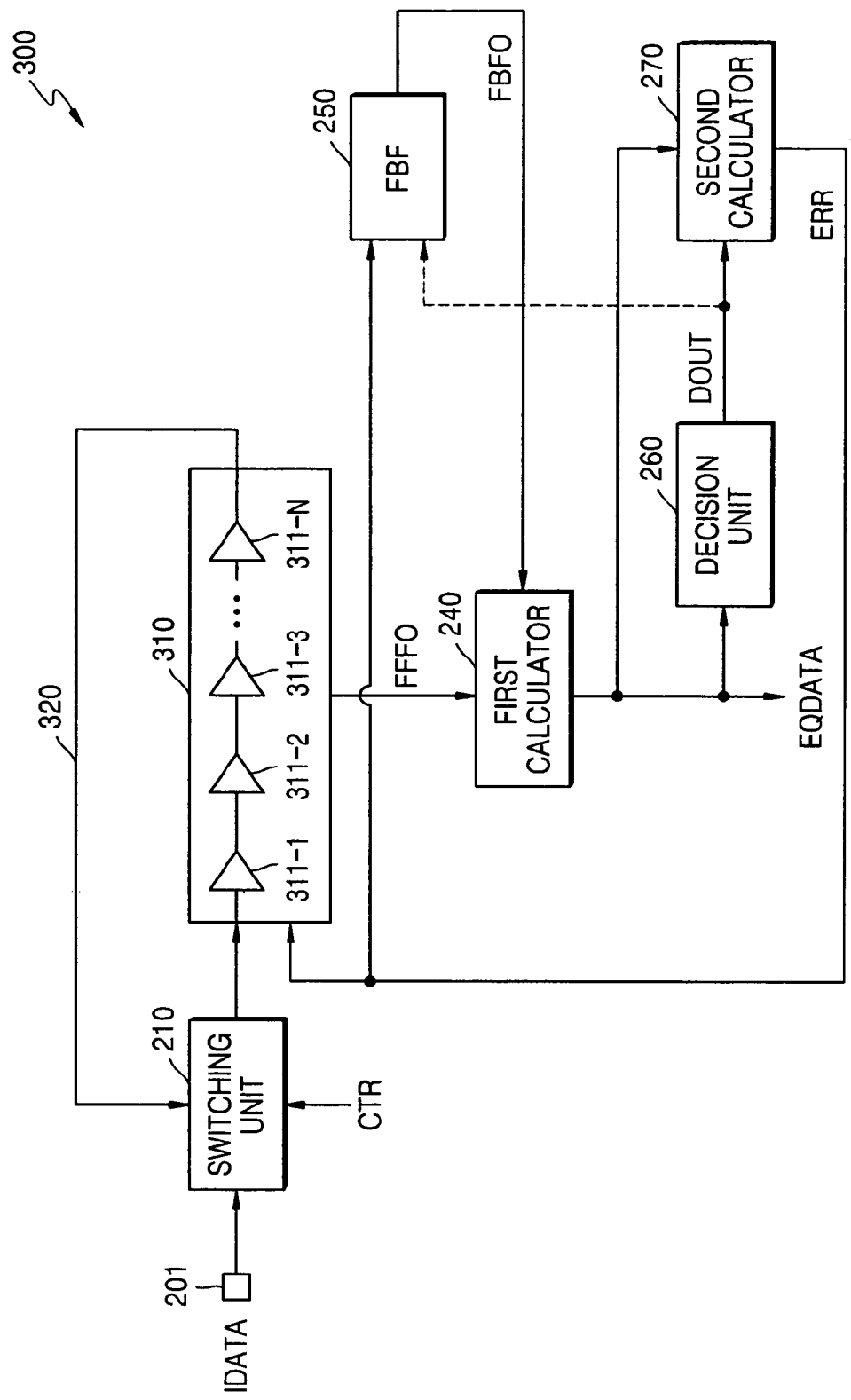
FIG. 3 is a block diagram of a channel equalizer according to another exemplary embodiment of the present invention.

FIG. 3 is a block diagram of a channel equalizer according to another exemplary embodiment of the present invention. Referring to FIG. 3, feed forward filter 310 may include a plurality of filter cells 311-1 through 311-N. In this example, the umber of filter cells is the same as the number N of symbols in a segment of a data frame. Here, the number N of symbols of a segment may be 832, and each of the plurality of filter cells 311-1 through 311-832 may store symbols of a corresponding training sequence among the 832 symbols. Each symbol may consist of K bits (K being a natural number, for example, K=10).

Referring to FIG. 3, the channel equalizer 300 may include a switching unit 210, a feed forward filter 310, a first calculator 240, a feed backward filter 250, a decision unit 260, and a second calculator 270. The functions and operations of the respective units 210, 240, 250, 260, and 270 shown in FIG. 3 are the same as those of the respective units 210, 240, 250, 260, and 270 shown in FIG. 2, and thus a detailed explanation is not repeated here for reasons of brevity.

The feed forward filter 310 may include 832 serially-connected filter cells 311-1 through 311-832. An 832-nd filter cell 311-832 may be connected to a second input terminal of the switching unit 210 via a feedback path 320. Accordingly, an output signal output from filter cell 311-832 of the feed forward filter 310 may be fed back to a first filter cell 311-1 of the feed forward filter 310, via the feedback path 320, the second input terminal of the switching unit 210 (not shown for clarity, but at the intersection of path 320 and switching unit 210), and an output terminal (not shown) of the switching unit 210. In this example, if a first symbol is stored in the N-th filter cell 311-832, an 832-nd symbol may be stored in the first filter cell 311-1.

If the output signal EQDATA of the channel equalizer 300 does not converge, the switching unit 210 connects its second input terminal to its output terminal in response to a control signal CTR received in a first state (for example, a logic 'low'). If the output signal EQDATA of the channel equalizer 300 converges, the switching unit 210 connects the first input terminal 201 to the output terminal of the switching unit 210 in response to a control signal CTR received in a second state (for example, a logic 'high').

Figure 4:
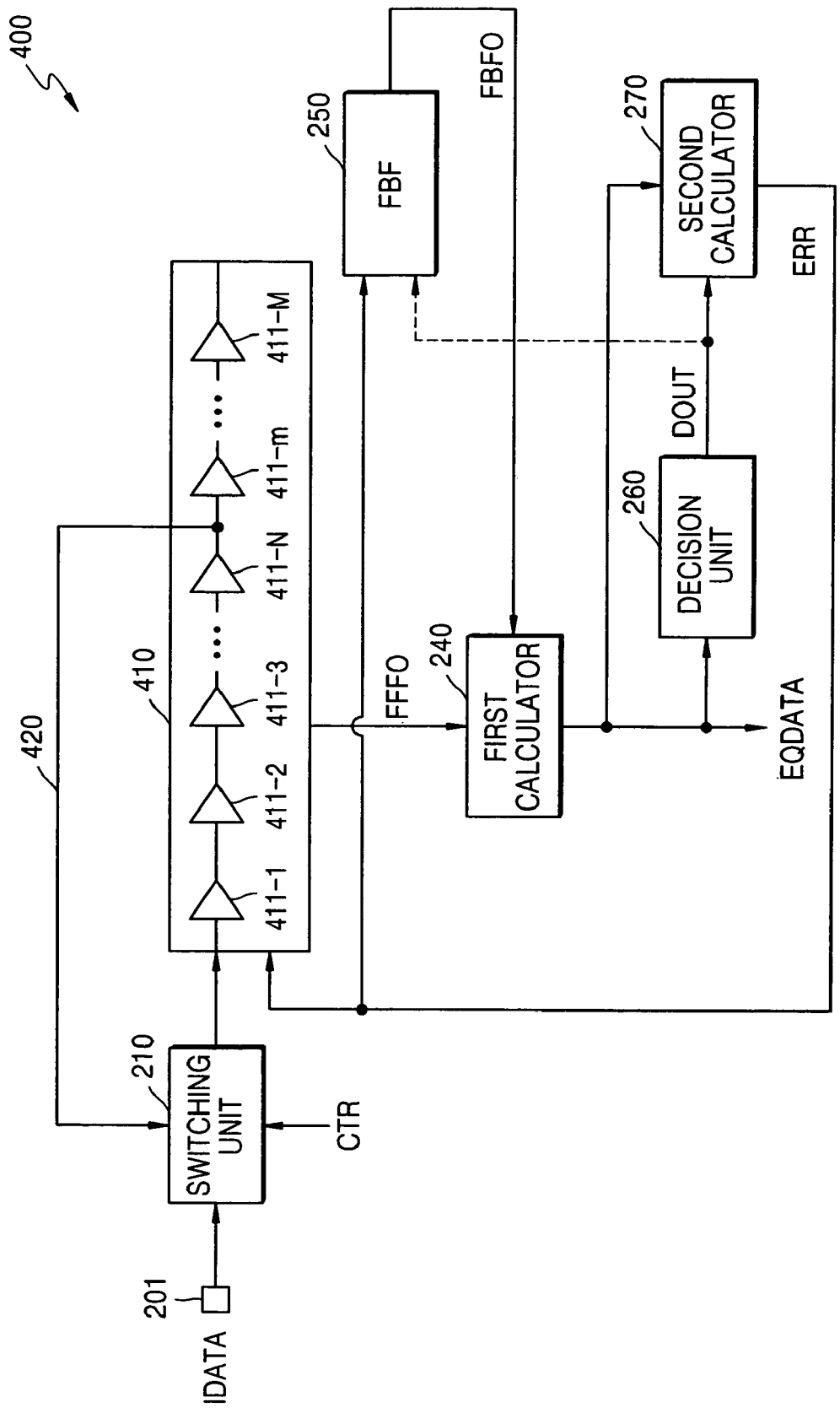
FIG. 4 is a block diagram of a channel equalizer according to another exemplary embodiment of the present invention.

FIG. 4 is a block diagram of a channel equalizer according to another exemplary embodiment of the present invention. The channel equalizer 400 of FIG. 4 is essentially the same as the channel equalizer 300 of FIG. 3, except for the illustrated feed forward filter 410. Referring to FIG. 4, a feed forward filter 410 may include a plurality of serially-connected filter cells 411-1 through 411-M. In this example, the number (M) of filter cells may be greater than the number (N) of symbols in a segment of a data frame. In this example, N=832 (symbols in a segment), m=833, M=1024, the and the plurality of filter cells 311-1 through 311-832 may respectively store symbols of a corresponding training sequence among 832 symbols. Each symbol may consist of a natural number of K bits (i.e., K=10).

In FIG. 4, the 832-nd filter cell 411-N (N=832), may be connected to the second input terminal of the switching unit 210 via a feedback path 420. Accordingly, an output signal of the feed forward filter 410 may be fed back as an input to the feed forward filter 410, via the feedback path 420 and the switching unit 210.

Although described primarily in terms of hardware above, the exemplary channel equalizer and methodologies illustrated by FIGS. 2-4 may also be embodied in software as a computer program. For example, a program in accordance with the exemplary embodiments of the present invention may be a computer program product causing a computer to execute one of the exemplary methods of equalizing a channel The computer program product may include a computer-readable medium having computer program logic or code portions embodied thereon for enabling a processor of the apparatus to perform the methodology to equalize a channel in accordance with one or more of the exemplary methods.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

The computer program logic may thus cause the processor to perform one or more of the exemplary channel equalizing methods described herein. Therefore, by causing a computer to execute the program, distortion in a signal received at a channel equalizer may be compensated for in accordance with the exemplary methodologies.

These programs may also be provided in the form of an externally supplied propagated signal and/or a computer data signal embodied in a carrier wave. The computer data signal embodying one or more instructions or functions of the exemplary methodology may be carried on a carrier wave for transmission and/or reception by an entity that executes the instructions or functions of the exemplary methodology. For example, the functions or instructions of the exemplary embodiments may be implemented by processing one or more code segments of the carrier wave in a computer controlling a given network configuration such as a HDTV broadcast system, where instructions or functions may be executed to equalize a channel in accordance with the exemplary methods described herein.

Further, such programs, when recorded on computer-readable storage media, may be readily stored and distributed. The storage medium, as it is read by a computer, may enable the transmission of packets and/or blocks by the exemplary transmission methods described herein.

As described above, according to the exemplary embodiments of the present invention, it may be possible to increase convergence speed of an signal that is input to a channel equalizer. This may be done by feeding back a training sequence (or symbols of a training sequence) stored in the filter cells of a feed forward filter, as an input to the feed forward filter, when an output signal of the channel equalizer does not converge. Additionally, since the feed forward filter of the exemplary channel equalizer may store a training sequence (or symbols of a training sequence) for repeated use when the output signal of the channel equalizer does not converge, the channel equalizer does not require a separate storage device, potentially reducing channel equalizer size. Further, since the channel equalizer according to the exemplary embodiments of the present invention may prevent actual data (DATA+FEC of FIG. 1) from being stored in the feed forward filter, when an output signal of the channel equalizer converges, it may be possible to substantially reduce current consumption of the channel equalizer.

The exemplary embodiments of the present invention being thus described, it will be obvious that the same may be varied in many ways. For example, the functional blocks of FIGS. 2-4 describing the exemplary apparatus and methods may be implemented in hardware and/or a combination of hardware and software. The hardware and the combination of hardware and software implementations may include a combination of processor(s) and article(s) of manufacture. The article(s) of manufacture may further include storage media and executable computer program(s).

The executable computer program(s) may include the instructions to perform the described operations or functions. The computer executable program(s) may also be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. A channel equalizer, comprising:
a feed forward filter including a plurality of serially-connected filter cells; and
a switching unit receiving a signal input to the channel equalizer and an output signal from the feed forward filter via a feedback path, and supplying an output signal as an input to the feed forward filter, wherein the plurality of serially-connected filter cells is embodied as a shift register, wherein
the switching unit is configured to receive a control signal,
the switching unit supplies, based on receipt of the control signal in a first state, the output signal of the feed forward filter via a feedback path as an input to the feed forward filter, if the output signal of the channel equalizer does not converge, else
the switching unit supplies, based on receipt of the control signal in a second state, signals excluding a training sequence from signals that compose the input signal to the channel equalizer, as an input to the feed forward filter.

2. The channel equalizer of claim 1, wherein
the plurality of serially-connected filter cells is configured to store a corresponding training sequence.

3. A channel equalizer, comprising:
a feed forward filter including a plurality of serially-connected filter cells, an input terminal, and an output terminal, wherein the plurality of serially-connected filter cells is embodied as a shift register; and
a switching unit having a first input terminal for receiving an input signal, a second input terminal connected to the output terminal of the feed forward filter via a feedback path, and an output terminal connected to the input terminal of the feed forward filter, wherein
the switching unit, based on receipt of a control signal in a first state, connects the second input terminal to the output terminal of the switching unit, if the output signal of the channel equalizer does not converge, else
the switching unit, based on receipt of the control signal in a second state, connects the first input terminal to the output terminal of the switching unit.

4. The channel equalizer of claim 3, wherein the switching unit connects one of the first input terminal and the second input terminal to the output terminal of the switching unit, based on a control signal.

5. The channel equalizer of claim 3, wherein the plurality of filter cells is configured to store a training sequence.

6. A channel equalizer, comprising:
a feed forward filter including a plurality of serially-connected filter cells;
a buffer unit connected to an output terminal of the feed forward filter, wherein the buffer unit includes a plurality of serially-connected filter cells, and each of the filer cells of the feed forward filter and the buffer unit is embodied as a shift register; and
a switching unit which receives a signal input to the channel equalizer and an output signal of the buffer unit and supplies, as an input to the feed forward filter, one of the input signal and the output signal of the buffer unit, wherein the switching unit supplies, based on receipt of a control signal in a first state, the output signal of the feed forward filter to the feed forward filter via a feedback path as an input thereto, if the output signal of the channel equalizer does not converge, else the switching unit supplies, based on receipt of the control signal in a second state, signals excluding a training sequence from signals that compose the input signal of the channel equalizer, as an input to the feed forward filter.

7. The channel equalizer of claim 6, wherein each of the filter cells of the feed forward filter and the buffer unit is configured to store a training sequence.

8. An apparatus for equalizing a channel signal, comprising:

a feed forward filter including a plurality of serially-connected filter cells configured to compensate for distortion in a channel signal input to the apparatus; and a switching unit configured to supply, based on receipt of a control signal, an output signal to the feed forward filter via a feedback path, the feed forward filter compensating for distortion in the input channel signal based at least on the output signal received from the switching unit, wherein the plurality of serially-connected filter cells is embodied as a shift register, wherein the switching unit supplies, based on receipt of the control signal in a first state, an output signal of the feed forward filter via a feedback path to the feed forward filter as an input thereto, if an output signal of the apparatus does not converge, else the switching unit supplies, based on receipt of the control signal in a second state, signals excluding a training sequence from signals that compose the channel signal input to the apparatus, as an input to the feed forward filter.

9. The apparatus of claim 8, wherein the feed forward filter compensates for distortion in the input channel signal based on the output signal received from the switching unit and an error signal.

10. The apparatus of claim 9, wherein the error signal is generated based on one or more of an output signal of the apparatus and a decision value.

* * * * *